United States Patent [19]
Youell, Jr.

[11] Patent Number: 5,139,194
[45] Date of Patent: Aug. 18, 1992

[54] REUSABLE SELF-LOCKING CARTON AND TRAY ASSEMBLY

[75] Inventor: Donald R. Youell, Jr., Dublin, Ohio

[73] Assignee: American Corrugated Products, Inc., Columbus, Ohio

[21] Appl. No.: 792,960

[22] Filed: Nov. 15, 1991

[51] Int. Cl.$^5$ .............................................. B65D 43/06
[52] U.S. Cl. ............................... 229/23 R; 229/125.26; 229/177; 229/181; 493/102; 493/140
[58] Field of Search ................. 229/23 R, 23 BT, 177, 229/180, 181, 195, 198, 125.26, 122.1; 493/102, 140, 379, 390

[56] References Cited

U.S. PATENT DOCUMENTS

| | | | |
|---|---|---|---|
| 1,130,271 | 3/1915 | Hammond | 229/125.26 |
| 1,480,358 | 1/1924 | Wirtz | 229/125.26 |
| 2,039,315 | 5/1936 | Heineman | 229/177 |
| 2,370,927 | 3/1945 | Anderson | 229/125.26 |
| 2,799,440 | 7/1957 | Frederich et al. | 229/122.1 |
| 3,071,045 | 1/1963 | Budd | 493/102 |
| 3,465,944 | 9/1969 | Robinson | 229/23 R |
| 3,634,995 | 1/1972 | Curtis | 493/102 |
| 4,317,536 | 3/1982 | Dickerson | 229/23 R |

FOREIGN PATENT DOCUMENTS

| | | | |
|---|---|---|---|
| 603176 | 8/1960 | Canada | 229/125.26 |
| 664125 | 5/1963 | Canada | 229/23 R |

*Primary Examiner*—Gary E. Elkins
*Attorney, Agent, or Firm*—Mueller and Smith

[57] ABSTRACT

The present invention is addressed to an improved apparatus and method for making and using a self-locking container which may be non-destructively disengaged and thereafter re-interengaged. The invention features a polygonal container and an interlocking base and is well-suited where the container is also provided with an interlocking lid closing configuration. The base includes inwardly directed folded flanges which interengage with outwardly directed folded flanges provided on the lower edge of the container body. Therefore, when the container body section is nestingly mated with the base section, the oppositely-disposed flanges on each of the two respective container sections become lockingly engaged without the need for adhesives or other binding materials. If at any time, prior to shipment to the consumer, it becomes necessary to gain access to the contents of the locked container, either the locking ear tabs provided in the base section or the flange portion adjacent to the locking tabs may be severed, permitting disengagement of the interlocked container sections.

4 Claims, 4 Drawing Sheets

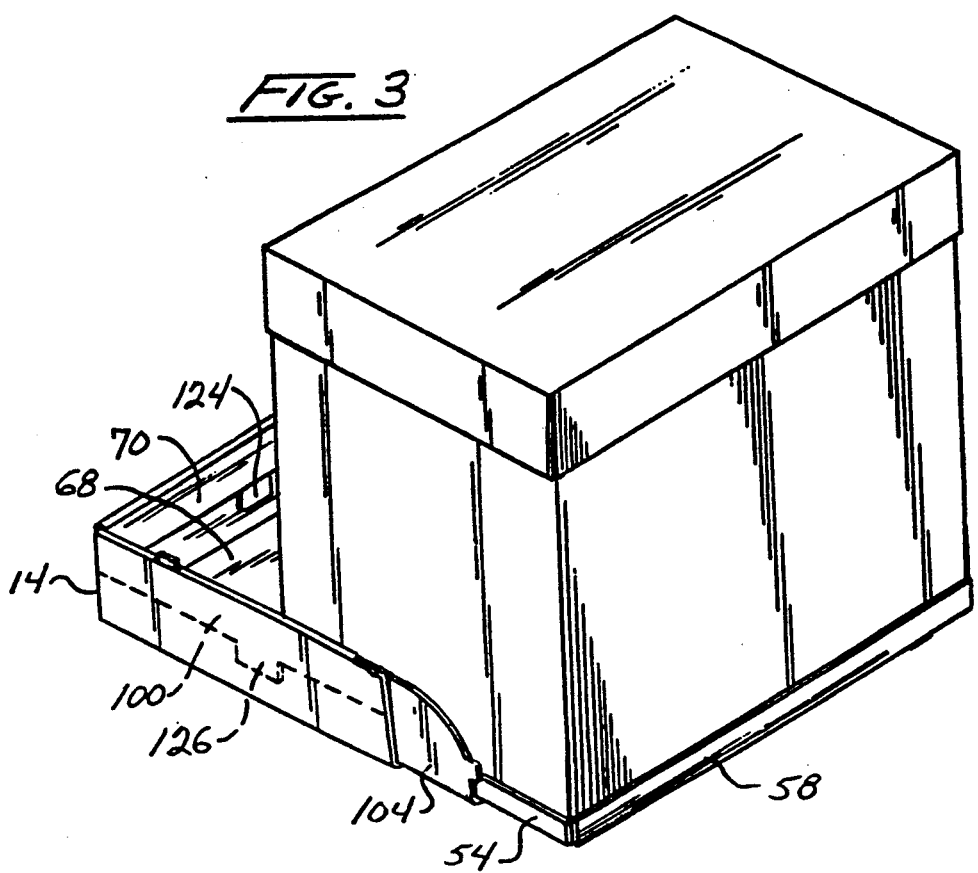
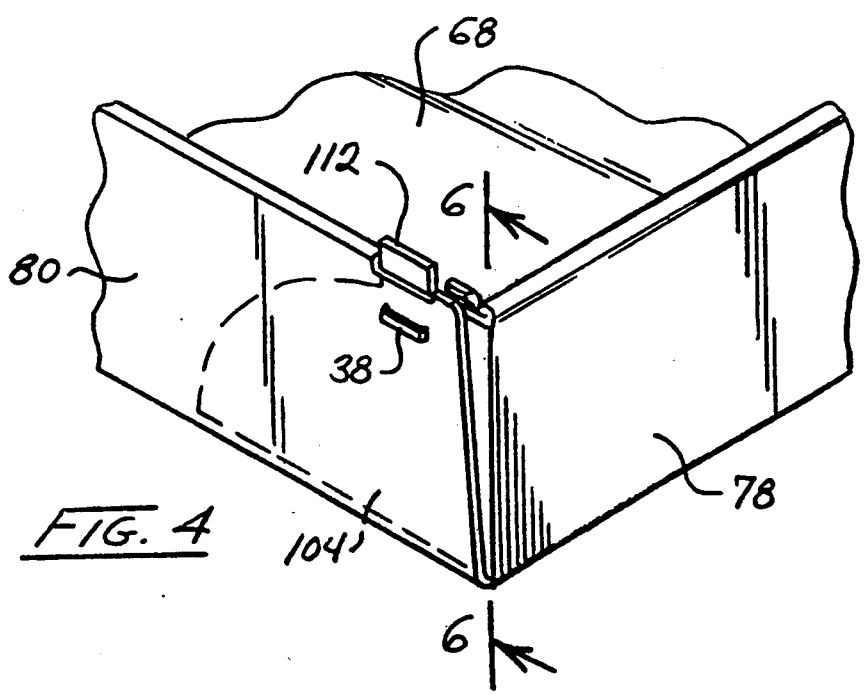

REUSABLE SELF-LOCKING CARTON AND TRAY ASSEMBLY

BACKGROUND OF THE INVENTION

The present invention relates to an improvement in the base of a self-locking container assembly and a method for using the same. The base is adapted to have locking ears which lock the sides of the base in place during storage and shipment. The base locking ears are adapted to be unlockable to permit disengagement of the interlocking container sections without losing the ability to reassemble the base for subsequent use.

In the past, various means having been provided for joining sections of cardboard and corrugated containers for storing manufactured products. Adhesive tape, strapping, glue, stapling, various folding configurations and other arrangements have been employed. Many of these closure arrangements, especially those employing interlocking sections with destructive tear strips such as that taught by Kelly, U.S. Pat. No. 2,800, 266 and Houston U.S. Pat. No. Re. 26,557, provide for use of the container only one time since opening the container necessarily destroys the structural integrity of one of the interlocking sections. Consequently, when a self-locking container must be opened prior to final shipment, it generally necessitates repackaging the contents in a new container, adding the extra expense of labor and packaging. This added expense may be substantial when the containers involved are large or when a large number of containers must be opened for inspection or product recalls prior to shipment to the consumer. Furthermore, since only one set of packaging is generally calculated into the cost of goods, the cost of any additional packaging is taken directly out of gross profit.

Interlocking container arrangements which may be easily disengaged by access to the inner locking flange member, such as taught by Hammond, U.S. Pat. No. 1,130,271 and Anderson, U.S. Pat. No. 2,370,927, are generally not suitable for heavier packaging applications such as for washing machines and air conditioners where the base must be aggressively retained by the container body section. Such easily disengageable interlocking container arrangements also suffer from the inability to restrict access to the contents of a container since interlocking sections may be reinterengaged without signs of entry.

SUMMARY

The present invention is addressed to an improved apparatus and method for making the using a self-locking container which may be non-destructively disengaged and thereafter re-interengaged. The invention features a polygonal container and an interlocking base and is well-suited where the container is also provided with an interlocking lid closing configuration. The base includes inwardly directed folded flanges which interengage with outwardly directed folded flanges provided on the lower edge of the container body. Therefore, when the container body section is nestingly mated with the base section, the oppositely-disposed flanges on each of the two respective container sections become lockingly engaged without the need for adhesives or other binding materials. If at any time, prior to shipment to the consumer, it becomes necessary to gain access to the contents of the locked container, either the locking ear tabs provided in the base section or the flange portion adjacent to the locking tabs may be severed, permitting disengagement of the interlocked container sections.

To use the base section a subsequent time, it is simply a matter of first, refolding the previously lowered folded flange back into its original, vertical position and stapling the locking ears in place between the folds of the receiving walls. Then, the body section is once again nestingly mated with the base section and depressed until the oppositely-disposed folded flanges become lockingly engaged. The container is then ready for storage or shipment bearing the same interlocking structural properties as before the sections were disengaged.

Base sections may be provided with more than one hinged wall fitted with pivotable, tabbed locking ears enabling the container to be re-interengaged a proportional number of times.

The present invention is addressed to the method and apparatus for interlocking bases fitted with pivotable tabbed locking ears. However, the invention may be equally well adapted for use as an interlocking lid section, where access through the top of the container is suitable.

The present invention is particularly adapted to containers assembled from blanks of single wall corrugated fiberboard. However, it is apparent that other materials suitable for containers may be employed, if desired.

Therefore, a general feature of the present invention is the provision of an improved container locking mechanism which allows interlocking container sections to be nondestructively disengaged after being interengaged and thereafter re-interengaged.

A specific feature of the present invention is the provision of an improved locking mechanism for a rectangular container assembly having a walled base section which interlocks with a walled body section during shipment but which may be nondestructively removed and locked a second time for a subsequent shipment.

Another feature of the invention provides a method for forming a nondestructively disengageable container assembly of a walled body section and a walled base section, which comprises:

- providing the walled body section to have folded flanges formed by folding a portion of the walls outwardly back on themselves;
- providing the walled base section to have folded flanges formed by folding a portion of the walls inwardly back on themselves, each of a pair of opposing folded walls of the base section bearing a slot near an end thereof; the walled base section further provided with an intermediate hinged folded flange disposed between a pair of opposing folded walls terminated at both ends with hinged tabbed locking ears which are positioned between the folds of the pair of opposing folded walls such that the tabs are disposed through the slots.
- lockingly engaging the sections by nestingly, abuttably engaging the folded flanges of the sections, the locking ears adapted to be nondestructively removed from the opposing folded walls while the sections are nestingly interengaged by severing the tab portion disposed through the slots.

Another feature of the invention provides an alternate method of non-destructively releasing the locking ears by severing the flange portions between the slots and the flange ends.

Other features of the invention will, in part, be obvious and will, in part, appear hereinafter. The invention, accordingly, comprises the mechanism and method possessing the construction of elements, arrangement of parts and steps which are exemplified in the following detailed description.

For a fuller understanding of the nature and objects of the invention, reference should be had to the following detailed description taken in connection with the accompanying drawings.

BRIEF DESCRIPTION OF THE DRAWINGS

FIG. 3 is a perspective view, similar to FIGS. 1 and 2, showing the container body section being slidingly disengaged from the base section;

FIG. 4 is a partial perspective view depicting the base locking mechanism after reassembly, stapling and re-interengagement of the interlocking container sections;

DETAILED DESCRIPTION OF THE INVENTION

The apparatus and method of the present invention may be constructed of a variety of polygonal shapes as well as a variety of suitable materials including corrugated board, paperboard, plastic or other semi-flexible materials. Furthermore, the top of the container may be closed in a number of suitable means, including a separate locking lid arrangement or hinged folding flaps as part of the body section. For the purpose of the instant description, the apparatus and method are disclosed in conjunction with the formation of a rectangular container assembly, having a separate lid assembly and constructed of single wall corrugated paperboard.

Figure 1:
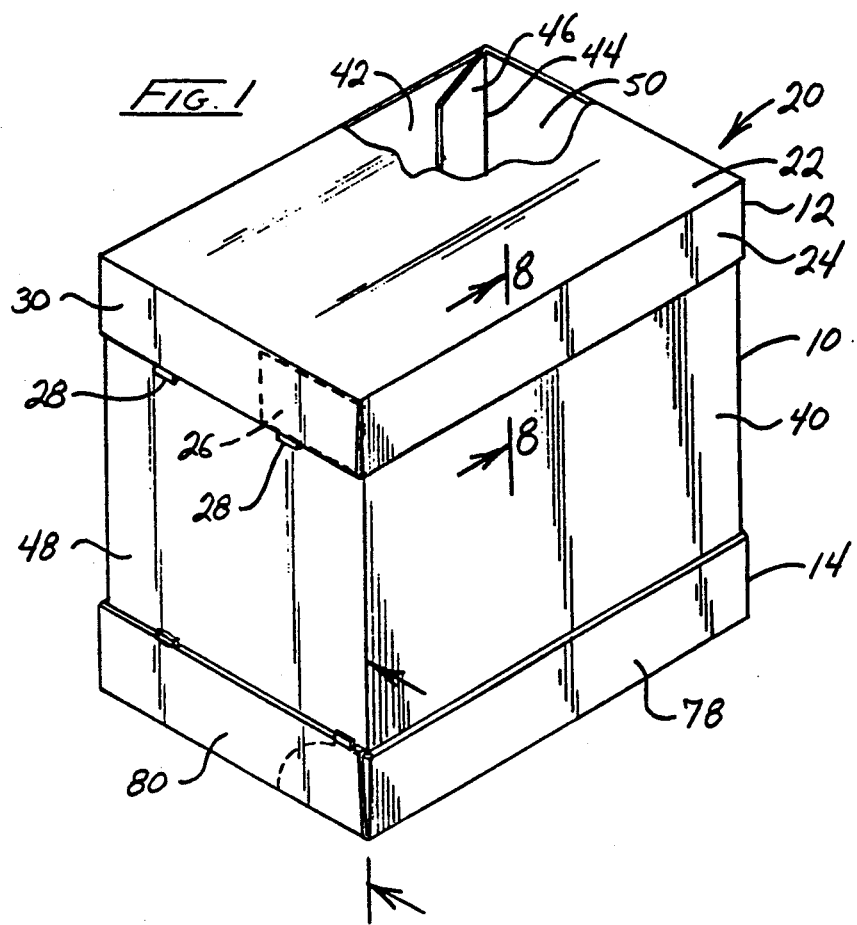
FIG. 1 is a perspective view showing an assembled container with a cover and base therefor.

Referring to the drawings, in particularity to FIG. 1, container assembly, generally depicted at 20, comprises a rectangular body section 10, a lid section 12 and a base section 14. Body 10 includes upstanding single thickness sidewalls 40 and 42, jointed to upstanding end walls 48 and 50, by wall angle fold lines, such as 44. End wall 50 is provided with hinged and inwardly directed wall joining flap 46. Where end wall 50 and side wall 42 abut, body section 10 is secured in a polygonal configuration by fixing wall joining flap 46 to the inside face of side wall 42 by a gluing, stapling or other affixing means.

Figure 2:
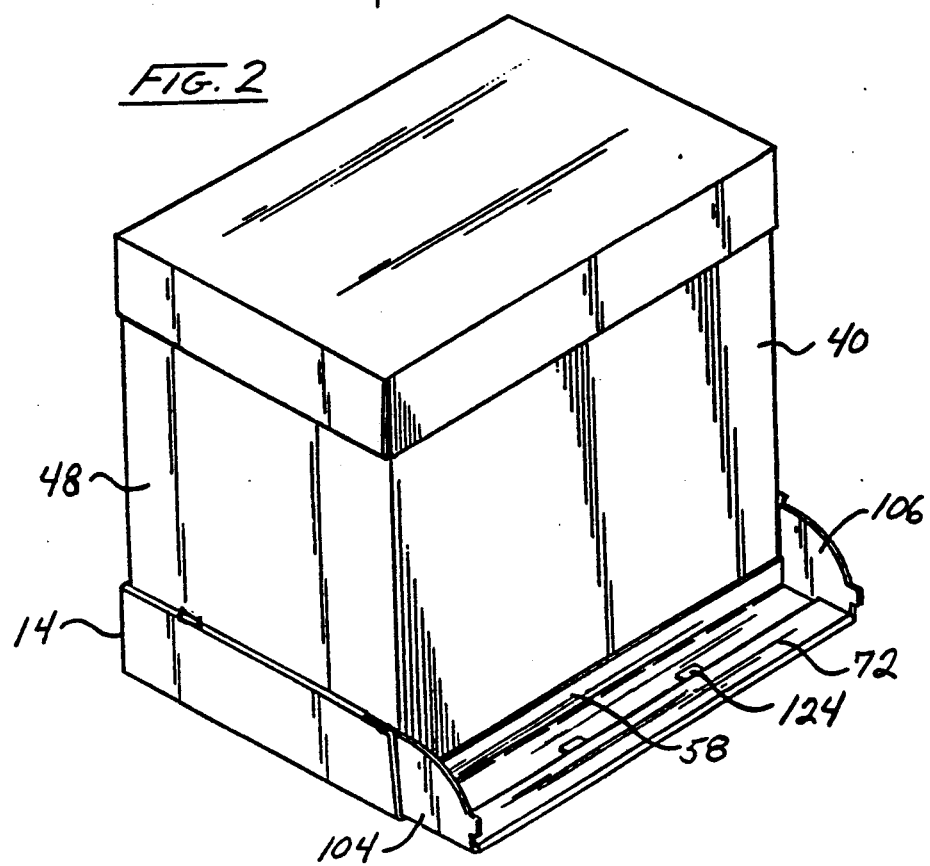
FIG. 2 is a perspective view, similar to FIG. 1, showing the hinged folded flange with locking ears in its distended position after severing the than retaining section of the end wall but prior to disengagement of the interlocking container sections.

Referring additionally to FIG. 2, the lower ends of side walls 40 and 42, and of end walls 48 and 50 form a perimeter of outwardly and upwardly directed locking flange portions, such as 58, providing a locking means for cooperatively retaining base 14. A similar perimeter flange of outwardly and downwardly folded flange portions is formed at the upper ends of side walls 40 and 42, and of end walls 48 and 50, providing a locking means for cooperatively retaining lid 12, generally depicted in FIG. 8.

As substantially shown in FIG. 1, lid section 12 of container assembly 20 comprises a top panel 22 having depending side walls, such as 24, arranged to telescope over the open end portion of container body 10. Lid side wall 24 is provided with hinged locking ear 26, shown in phantom, tucked into and held nestingly captive by double folded end wall 30, with locking tabs, such as 28, inserted into spaced openings provided along lower edge of top panel 22. Lid 12 includes means inwardly thereof for interengagement with the outwardly and downwardly directed flanges, such as 52, formed at the uppermost portions of body side walls 40 and 42 and end walls 48 and 50 when lid 12 is closingly placed over body 10, thereby providing a positive locking arrangement between body and cap 12. Such locking engagement being substantially depicted in FIG. 8.

Figure 7:
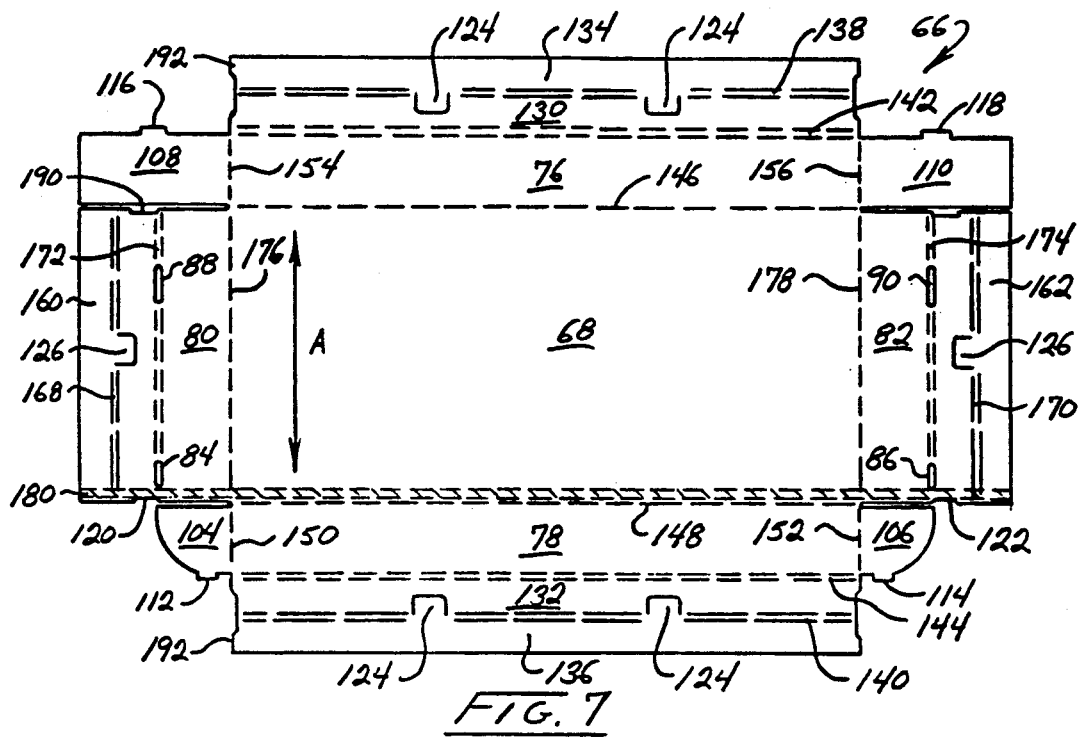
FIG. 7 is a plan view of the container base blank in an unfolded configuration showing the placement of cut lines and fold lines.

Referring to FIG. 7, base section 14 of container 20 if formed from foldable blank 66. Parts of blank for base 14 of container 20 are identified with identical reference numbers used to identify the respective parts of fully assembled or partially disassembled container assembly as depicted in FIGS. 1, 2, 3 and 4. Blank 66 is shown in its final form after it has been die cut form a single sheet of corrugated paperboard. Blank 66 is prescored, as indicated by long broken lines, such as 146, with perforated score lines being depicted generally by short broken lines, such as 142, to provide proper folding of base subsections into base section 14. Cut portions of blank 66 are depicted by solid lines, such as at 124.

Still referring to FIG. 7, blank 66 is shown comprised of a rectangular bottom 68, oppositely disposed outer side walls 76 and 78 extending upwardly on fold lines 146 and 148, respectively, and oppositely disposed outer end walls 80 and 82 extending upwardly on fold lines 176 and 178 respectively. Side wall 78 is terminated at both its ends by hinged tabbed locking ears 104 and 106, which are inwardly directed along respective fold lines 150 and 152. Similarly, oppositely disposed side wall 76 is terminated at both its ends by hinged tabbed locking panels 108 and 110, which are inwardly directed along respective fold lines 154 and 156. Double folded base side wall locking flanges, such as 72 shown in FIG. 2, are formed along parallel, double perforated fold lines 142 and 144 after base side wall locking flange inner panels 134 and 136 are folded inwardly along their respective fold lines 138 and 140.

Body 10 and base 14 sections are used in the following manner by the manipulative steps exemplified below.

Figure 8:
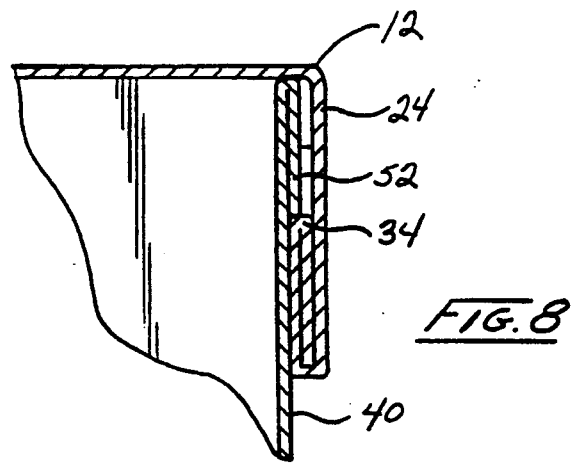
FIG. 8 is a partial sectional view taken along line 8—8 of FIG. 1 depicting the interengagement of the base and lid sections.

Referring to FIG. 3, beginning as a prescored and glued configuration in a flattened condition (not shown), body section 10 is prepared for interengagement with base 14 by folding lower body sidewall locking flanges, such as 58, and lower end wall locking flanges, such as 54, outwardly and upwardly back onto sidewalls 40 and 42 and end walls 48 and 50 themselves. Body 10, if container assembly 20 were to employ an interlocking lid configuration, would additionally require a similar folding of respective upper end wall and sidewall locking flanges, such as 52, to form edge for lockingly engaging oppositely disposed flange 34 of lid 12, as depicted in FIG. 8. Upon folding of all locking flanges, flattened body section 10 is opened into its polygonal shape, forming semi-perimetric flanges at the uppermost and lower most edges of container, being constituted of lower body end wall locking flange 54 and lower body sidewall locking flange 58 and of their oppositely disposed counterparts, 56 and 60 (not shown). These outwardly and upwardly directed semi-perimeter interlocking flanges also serve to reinforce the scored lower perimeter edge of body 10 and strengthen the lower corners thereof.

Blank 66, shown in FIG. 7, is assembled into fully set up base 14, shown in FIG. 1, by performing the steps herein below exemplified. First, base sidewalls 76 and 78 are formed by respectively folding base sidewall flange interior panels 134 and 136 substantially 180° upwardly along parallel, double fold lines 138 and 140, to lie inwardly and adjacent to the inner face of outer folds 130 and 132 of base sidewalls 76 and 78 and then additionally being folded substantially 180° upwardly along parallel, double perforated fold lines 142 and 144. Folded flanges 130 and 132 may then be affixed to the inner face of base sidewalls 76 and 78, by stapling or other securing means. Base sidewalls 76 and 78 are completed by bending the resulting double folded panels substantially 90' upwardly along respective fold lines 146 and 148, placing base sidewalls 76 and 78 in a vertical position. As the base sidewalls are being manipulated upwardly, respective tabbed locking flaps 108 and 110 and tabbed locking ears 104 and 106 are bent 90° along their respective fold lines 54, 156, 150, and 152 until perpendicular to base bottom 68 and in line with base end wall fold lines 176 and 178.

Figure 5:
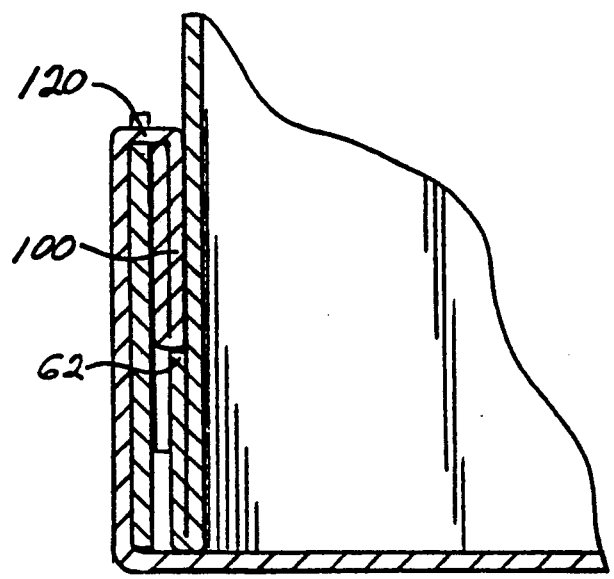
FIG. 5 is a partial sectional view taken along line 5—5 of FIG. 1 depicting the interengagement of the base and body sections prior to severing either the locking ear tab or tab retaining section.
Figure 6:
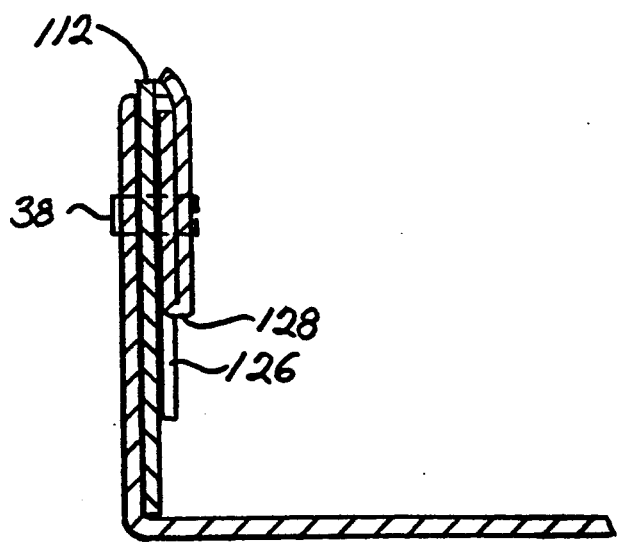
FIG. 6 is a partial sectional view taken along line 6—6 of FIG. 4 depicting the interengagement of the base and body sections after severing the tab retaining section of the folded flange of the end wall.

Each of the base end walls 80 ad 82 is formed by respectively folding end wall locking flanges interior panels 160 and 162 substantially 180° upwardly along parallel, double scored fold lines 168 and 170. End wall locking flange portions, such as 100, shown in phantom in FIG. 3, may then be stapled through its own double thickness to retain its folded configuration. End walls 80 and 82 are then folded 90° upwardly along scored fold lines 176 and 178 respectively until the inner faces of end walls 80 and 82 are facingly adjacent to the outer faces of tabbed locking members 104, 108 and 106, 110. Folded flange portions 100 and 102 (not shown) are then folded substantially 180° downwardly along respective parallel, double perforated fold lines 172 and 174 thereby respectively retaining tabbed locking members 104 and 108 and 106 and 110 between end wall 80 and end wall locking flange 100 and end wall 82 and end wall locking flange 102 (not shown), vertically disposing locking members tabs 112, 114, 116 and 118 through respective tab locking slots 84, 86, 88 and 90. Referring to FIGS. 5 and 6, it can be seen that the locking tab 112 of hinged locking ear 104 is retained by the tab retaining section 120 of the folded flange 100 formed between the slot 84 and the near end of the end wall 80. Although not shown in detail, a similar locking arrangement is respectively achieved at the opposite end of outer side wall 78 by locking tab 114, hinged locking ear 106 and tab retaining section 122 and end wall 82. Completely assembled end walls 80 and 82 are captively retained vertically by interlocking lateral notches, such as 190, formed at opposite ends of end walls 80 and 82 with corresponding laterally, perpendicularly disposed lateral tabs, such as 192, formed at opposite ends of side walls 76 and 78. Alternately, end walls 80 and 82 and their corresponding nestingly disposed locking flaps 108, 110 and locking ears 104, 106 may be secured in their vertical orientation by affixing staples through the complete thickness of the flanges 100 and 102 and end walls 80 and 82, such as medially along the length of end walls, care being taken not to staple through any wall portion of base 14 containing tabbed locking ears 104 and 106.

Referring to FIGS. 1-3, and 8, lid section 12 is shown in a closed and locked position on container body 10. Oppositely disposed lid locking flanges, such as 34, project inwardly and upwardly toward container 10, and lockingly engage along the bottom edge of corresponding downwardly folded flanges, such as 52, depending from the upper perimeter of body 10 when lid 12 is thereon matingly engaged. Tensioning of body flange 52 and lid flange 34 is such that once lid 12 has been placed in locking engagement with body section 10, disengagement of the matingly engaged sections requires the destruction of either.

Referring to FIGS. 1, 2, 3, and 5, FIG. 1 shows body 10 in a closed and locked position, nesting engaged within base 14. The perimetrical locking base flange formed by the combination of end walls flanges 100 and 102 and sidewall flanges 70 and 72, project inwardly and downwardly toward container body 10, and are lockingly engaged with the upper edges of the base perimeter flange, such as 62, formed by the combination of body sidewall locking flanges 58 and 60 (not shown) and body end wall locking flanges 54 and 56. The outturned body sidewall locking flange 58 is dependingly coupled with body end wall locking flange 54, forming a continuous, semi-perimeter flange at the lower edge of body section 10. Sidewall flange 60 (not shown) and end wall flange 56 (not shown) form a semi-perimeter flange substantially around the remainder of the lower edge of body section 10. Being under tension, upturned lower body flanges 54, 56, 58 and 60 are maintained in face-to-face abutment with base sidewall and end wall spacing tabs, such as 124 and 126 shown in FIG. 3, provided to ensure proper engagement between the upturned body flange 58 and the down-turned base flange 72 and to prevent the over-engagement of flange edges, such as where body flange locking edge 62 and base end wall flange locking edge 128 meet, essentially as shown in FIGS. 5 and 6.

Referring to FIGS. 4, 5, 6 and 7, upon locking body section 10 into base section 14, the non-destructive disengagement of the sections is facilitated by severing tab retaining sections 120, 122 and folding sidewall 78 along fold line 148 substantially 90° downwardly, as shown in FIG. 2. Container body 10 may then be slidingly disengaged from the base section through the portal opened by distended sidewall 78, as in FIG. 3. Once base section 14 and body section 10 have been fully disengaged, body section may be lifted to gain full access to the contents of the container.

Alternately, base 14 and body 10 sections may be non-destructively disengaged by severing those portions of locking tabs 112 and 114 vertically disposed through tab locking slots 84 and 86. After locking tabs 112 and 114 have been severed, sidewall 78 may be pivotally distended 90° downwardly about fold line 148. Once sidewall 78 is completely, distended, as in FIG. 2, body 10 may be slidingly disengaged from base 14.

After locking ears 104 and 106 have been disengaged from their cooperative locking slots 84 and 86 by either heretofore described severing method, base section 14 may be reassembled to once again permit locking engagement with container body 10. With locking ears 101 and 106 directed inwardly, base sidewall 78 may be folded substantially 90° upwardly along fold line 148 until locking ears 104 and 106 are in sliding, nesting engagement between the inner faces of end walls 80 and 82 and end wall locking flanges 100 and 102, as in FIG. 6. Once base sidewall 78 is fully erect, locking ears are secured into place by affixing a staple, such as 38, through the portions of end walls 80 and 82 containing the nestingly engaged locking ears 104 and 106, essentially as depicted in FIGS. 4 and 6. After locking ears have been secured by staples, such as 38, base 14 is fully prepared for locking re-interengagement with container body 10 with structural integrity substantially equivalent to that before the body and base 14 sections were severingly disengaged.

Referring to FIG. 7, corrugations of base blank 66 is depicted by arrow A. Such vertical corrugations provide the downwardly and inwardly directed base sidewall locking flanges 70 and 72 with increased compression strength to resist flange failure from lateral pressure that may be applied to body sidewalls 40 and 42 during shipping and storage of a loaded container assembly. Reinforcing material, such as tape strip 180, is provided to strengthen short tab retaining sections 120 and 122 of base end walls 80 and 82, allowing the retaining sections to resist under the shearing pressure of locking tabs 112 and 114.

Since certain changes may be made in the above apparatus and method without departing from the scope of the invention herein involved, it is intended that all matter disclosed in the above description or shown in the accompanying drawings shall be interpreted as illustrative and not in a limiting sense.

I claim:

1. In a container assembly having at least two interengaging locking sections, said sections being lockingly engaged by abuttably engaging inwardly folded flanges from a first said section with oppositely disposed outwardly folded flanges of a second said section, an improved locking mechanism for said sections to be nondestructively disengaged after being interengaged and thereafter reinterengaged, which comprises:

each of a pair of said oppositely-disposed inwardly folded flanges of said first section bearing a slot near an end of each of said flanges and forming a tab retaining section; an intermediate hinged folded flange having two ends and disposed between said pair of oppositely-disposed inwardly folded flanges which intermediate flange is terminated with hinged locking ears having tabs said ear being positioned within folds of said oppositely-disposed inwardly folded flanges such that said tabs are disposed through said slots, said locking ears adapted to be nondestructively disengaged by severing either said tabs or each of said tab retaining sections.

2. In a rectangular container assembly of a walled body section and a walled base section, each of said sections being rectangular and having folded flanges formed by folding a portion of said walls back on themselves, said body section folded outwardly and said base section folded inwardly, said container assembly formed by interengaging said folded flanges of said sections, an improved locking mechanism for said sections to be nondestructively disengaged after being interengaged and thereafter reinterengaged, which comprises:

each of a pair of opposing said folded walls of said base section bearing a slot near an end of each of said folded walls and forming a tab retaining section;

an intermediate hinged folded flange disposed between said pair of opposing folded walls and terminated with hinged locking ears having tabs, said ears being positioned between folds of said pair of opposing folded walls such that said tabs are disposed through said slots, said locking ears adapted to be nondestructively removed from said opposing folded walls while said sections are nestingly interengaged by severing either said tabs disposed in said slots or each of said tab retaining sections.

3. The apparatus of claim 2 wherein said tab retaining sections are reinforced.

4. A method for forming a nondestructively disengageable container assembly of a walled body section and a walled base section, which comprises:

(a) providing said walled body section to have folded flanges formed by folding a portion of said walls outwardly back on themselves;

(b) providing said wall base section to have folded flanges formed by folding a portion of said walls inwardly back on themselves, each of a pair of opposing said folded walls of said base section bearing a slot near an end of each of said folded walls and forming a tab retaining section; said walled base section further provided with an intermediate hinged folded flange disposed between said pair of opposing folded walls, said intermediate folded flange terminated with hinged locking ears having tabs said ears being positioned between folds of said pair of opposing folded walls such that said tabs are disposed through said slots.

(c) lockingly engaging said section by nestingly, abuttably engaging said folded flanges of said sections, said locking ears adapted to be nondestructively removed from said opposing folded walls while said sections are nestingly interengaged by severing either said tabs in said slots or each of said tab retaining sections.

* * * * *